United States Patent
Kukuchka et al.

(10) Patent No.: US 9,380,454 B2
(45) Date of Patent: *Jun. 28, 2016

(54) METHOD AND APPARATUS FOR USING A WIRELESS COMMUNICATION DEVICE WITH MULTIPLE SERVICE PROVIDERS

(71) Applicant: Apple Inc., Cupertino, CA (US)

(72) Inventors: Robert Kukuchka, Cupertino, CA (US); Shuvo Chatterjee, Cupertino, CA (US); Arun G. Mathias, Sunnyvale, CA (US); Matthew Klahn, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/298,832

(22) Filed: Jun. 6, 2014

(65) Prior Publication Data

US 2014/0349634 A1 Nov. 27, 2014

Related U.S. Application Data

(63) Continuation of application No. 13/730,526, filed on Dec. 28, 2012, now Pat. No. 8,750,873, which is a continuation of application No. 12/765,648, filed on Apr. 22, 2010, now Pat. No. 8,346,255.

(60) Provisional application No. 61/303,611, filed on Feb. 11, 2010.

(51) Int. Cl.
*H04W 8/22* (2009.01)
*H04W 8/18* (2009.01)
*H04W 60/00* (2009.01)
*H04W 48/18* (2009.01)

(52) U.S. Cl.
CPC ........ *H04W 8/22* (2013.01); *H04W 8/18* (2013.01); *H04W 60/00* (2013.01); *H04W 48/18* (2013.01)

(58) Field of Classification Search
CPC ........... H04W 8/22; H04W 8/12; H04W 8/26; H04W 8/183; H04W 24/02; H04W 36/36; H04W 36/28; H04W 48/18; H04W 60/00; H04W 72/02; H04W 72/044; H04W 88/06; H04W 52/28; H04W 8/18; H04W 4/001; H04B 2201/70723; H04L 61/60; H04L 12/2424
USPC ........... 455/418–420, 425, 432.3, 435.2, 449, 455/517, 524–525, 550.1, 551, 552.1, 455/556.2, 557; 370/310, 328, 338
See application file for complete search history.

(56) References Cited

U.S. PATENT DOCUMENTS 5,430,793 A * 7/1995 Ueltzen et al. .................. 379/98
6,016,427 A   1/2000 Barber et al.
(Continued)

FOREIGN PATENT DOCUMENTS

WO 2009032853 3/2009
WO 2009091837 7/2009

*Primary Examiner* — Meless Zewdu
(74) *Attorney, Agent, or Firm* — Downey Brand LLP

(57) ABSTRACT

Configuring a mobile wireless communication device using a carrier service configuration profile selected from a set of stored carrier service configuration profiles. Carrier service configuration profiles are selected based on one or more combinations of identifier values stored in the mobile wireless communication device. Carrier service configuration profiles are priority ranked based on a specificity of the one or more combinations of identifier values.

17 Claims, 5 Drawing Sheets

(56) References Cited

U.S. PATENT DOCUMENTS

| | | | |
|---|---|---|---|
| 6,199,158 B1 * | 3/2001 | Hirsch | H04M 1/72563 713/1 |
| 6,430,276 B1 * | 8/2002 | Bouvier et al. | 379/121.01 |
| 7,212,810 B2 | 5/2007 | Babbar et | |
| 7,277,701 B2 | 10/2007 | Almgren | |
| 7,522,906 B2 | 4/2009 | Whelan et al. | |
| 7,636,333 B2 | 12/2009 | Jothipragasam | |
| 8,055,249 B2 | 11/2011 | Pourtier et al. | |
| 8,130,738 B2 | 3/2012 | Chan et al. | |
| 8,175,034 B2 | 5/2012 | Ho et al. | |
| 8,245,284 B2 | 8/2012 | Jiang et al. | |
| 8,346,255 B2 * | 1/2013 | Kukuchka et al. | 455/435.2 |
| 8,750,873 B2 * | 6/2014 | Kukuchka et al. | 455/435.2 |
| 2004/0152488 A1 * | 8/2004 | Nakagomi | 455/558 |
| 2004/0210649 A1 * | 10/2004 | Bhogal et al. | 709/222 |
| 2004/0249915 A1 * | 12/2004 | Russell | 709/223 |
| 2004/0253947 A1 * | 12/2004 | Phillips | H04W 48/18 455/422.1 |
| 2005/0113088 A1 * | 5/2005 | Zinn et al. | 455/435.2 |
| 2005/0232209 A1 * | 10/2005 | Buckley et al. | 370/338 |
| 2006/0030315 A1 | 2/2006 | Smith et al. | |
| 2006/0223528 A1 | 10/2006 | Smith | |
| 2007/0135124 A1 * | 6/2007 | Davolos et al. | 455/435.1 |
| 2007/0275701 A1 | 11/2007 | Jonker | |
| 2007/0286094 A1 | 12/2007 | Wigglesworth et al. | |
| 2008/0107042 A1 | 5/2008 | Rengarajan et al. | |
| 2008/0144589 A1 * | 6/2008 | Buckley | 370/338 |
| 2008/0146223 A1 | 6/2008 | Welnick et al. | |
| 2008/0151851 A1 | 6/2008 | Sitch | |
| 2008/0182614 A1 | 7/2008 | Cormier et al. | |
| 2008/0234001 A1 * | 9/2008 | Elcan et al. | 455/556.2 |
| 2008/0304458 A1 | 12/2008 | Aghvami et al. | |
| 2009/0023445 A1 * | 1/2009 | Zinn | H04W 8/183 455/435.1 |
| 2009/0149178 A1 | 6/2009 | Bangma | |
| 2009/0157523 A1 | 6/2009 | Jones et al. | |
| 2010/0205281 A1 * | 8/2010 | Porter et al. | 709/220 |
| 2010/0216439 A1 * | 8/2010 | Marcelli et al. | 455/414.1 |
| 2010/0311404 A1 | 12/2010 | Shi et al. | |

\* cited by examiner

MCC/MNC Common to All Providers
EF$_{GID1}$ Specifies Provider A or B
EF$_{GID2}$ Specifies Feature Set 1 or 2

EF$_{GID1}$ 501
(3GPP TS 31.102)

| Identifier: '6F3E' | Structure: transparent | Optional |
|---|---|---|
| File size: n bytes | Update activity: low | |
| Access Conditions:<br>    READ               PIN<br>    UPDATE         ADM<br>    DEACTIVATE   ADM<br>    ACTIVATE     ADM | | |

| Bytes | Description | M/O | Length |
|---|---|---|---|
| 1 to n | USIM group identifier(s) | O | n bytes |

*FIG. 5A*

EF$_{GID2}$ 502
(3GPP TS 31.102)

| Identifier: '6F3F' | Structure: transparent | Optional |
|---|---|---|
| File size: n bytes | Update activity: low | |
| Access Conditions:<br>    READ               PIN<br>    UPDATE         ADM<br>    DEACTIVATE   ADM<br>    ACTIVATE     ADM | | |

| Bytes | Description | M/O | Length |
|---|---|---|---|
| 1 to n | USIM group identifier(s) | O | n bytes |

*FIG. 5B*

METHOD AND APPARATUS FOR USING A WIRELESS COMMUNICATION DEVICE WITH MULTIPLE SERVICE PROVIDERS

CROSS REFERENCE TO RELATED APPLICATIONS

This patent application is a continuation of U.S. patent application Ser. No. 13/730,526, entitled "METHOD AND APPARATUS FOR USING A WIRELESS COMMUNICATION DEVICE WITH MULTIPLE SERVICE PROVIDERS," filed Dec. 28, 2012, issuing as U.S. Pat. No. 8,750,873 on Jun. 10, 2014, which is a continuation of U.S. patent application Ser. No. 12/765,648 of the same title, filed Apr. 22, 2010, now U.S. Pat. No. 8,346,255, issued on Jan. 1, 2013, which claims the benefit of U.S. Provisional Application No. 61/303,611, entitled "WIRELESS COMMUNICATION DEVICE" by Robert Kukuchka et al., filed Feb. 11, 2010, each of which are incorporated by reference in their entirety for all purposes.

FIELD

The described embodiments relate generally to wireless mobile communications. More particularly, a method is described for configuring a mobile wireless communication device by selecting a service configuration profile based on stored identifiers.

BACKGROUND

Mobile wireless communication devices, such as a cellular telephone or a wireless personal digital assistant, can provide a wide variety of communication services including, for example, voice communication, text messaging, internet browsing, and electronic mail. Mobile wireless communication devices can also run a variety of applications that can generate and reproduce audio, video, pictures, graphics and text in multiple forms, thus providing a user of the mobile wireless communication device a content rich, multi-media experience. The user of the mobile wireless communication device can subscribe to one or more services offered by a wireless communication service provider that enable the mobile wireless communication device to access different resources through a wireless communications network. Each user's wireless communication service subscription can be customized to the user's specific requirements. Some users can prefer a voice communication only service through the mobile wireless communication device, while other users can subscribe to additional data services, such as access to the internet or unlimited text messaging. Services offered to a user can depend on the capabilities of the wireless communication service provider through which the user subscribes.

In order for the mobile wireless communication device to provide the user access to services offered by the wireless communication service provider, certain operational parameters can be configured in the mobile wireless communication device. Some mobile wireless communication device manufacturers customize mobile wireless communication devices for particular wireless communication service providers within a country or geographic region. With this customization, the wireless communication service provider can associate the mobile wireless communication device more closely with their brand and with a particular user experience. The mobile wireless communication device can be customized by loading a particular set of operational parameters specific to the wireless communication service provider at the time of manufacture by the mobile wireless communication device manufacturer. This customization method, however, can prove disadvantageous for the mobile wireless communication device manufacturer can be required to configure and ship multiple versions of the same mobile wireless communication device, each customized for a particular wireless service provider. It is preferable instead to manufacture one (or a few) versions of the mobile wireless communication device and to distribute generic versions of the mobile wireless communication device throughout the world. The mobile wireless communication device can then be customized closer to or at the final point of sale.

In addition, a user of the mobile wireless communication device can prefer to use the same mobile wireless communication device at different times with different wireless communication service providers. For example, the user can subscribe to a primary wireless communication service provider at home and to a secondary wireless communication service provider when traveling abroad. At present, automatic customization of a wireless communication device's configuration can depend on a limited set of parameters stored in the wireless communication device, thereby limiting the specificity of customization possible. Current methods cannot conveniently offer the flexibility to offer different groups of users that use the same manufactured wireless communication device on the same wireless communication network a different set of operational parameters, and thus a customized user experience automatically without manual user intervention. Thus there exists a need for a method to configure a wireless communication device based on a combination of identifiers stored in the wireless communication device to provide a customized configuration of the wireless communication device.

SUMMARY

This paper describes various embodiments that relate to methods to configure a wireless communication device. A method to configure a wireless communication device based on a combination of identifier values stored in the wireless communication device to provide a customized configuration of the wireless communication device is described.

In one embodiment a method of configuring a mobile wireless communication device the method includes at least the following steps. In a first step, accessing a set of identifier values stored in the mobile wireless communication device. In a second step, selecting a set of carrier service configuration profiles based on combinations of the accessed set of identifier values. The carrier service configuration profiles are stored in the mobile wireless communication device separately from the identifier values. In a third step, configuring the mobile wireless communication device using one of the selected carrier service configuration profiles.

In some embodiments the method further includes a step of assigning a priority ranking to each of the selected carrier service configuration profiles based on a specificity of the combination of identifiers used to select the carrier service configuration profiles. Some combinations of identifiers are more generic, while other combinations of identifiers are more specific. The mobile wireless is configured to use a carrier service configuration profile with the highest priority ranking.

In another embodiment, a mobile wireless communication device is described. The mobile wireless communication device includes at least a processor and a memory unit coupled with the processor. In the described embodiment, the processor configures the mobile wireless communication device by accessing a set of identifier values stored in memory unit, selecting a set of carrier service configuration profiles based on combinations of the accessed set of identifier values, and configuring the mobile wireless communication device using one of the selected carrier service configuration profiles.

In yet another embodiment, computer readable medium for tangibly storing computer program code executable by a processor for configuring a mobile wireless communication device is described. The computer readable medium includes computer program code for accessing a set of identifier values stored in the mobile wireless communication device, computer program code for selecting a set of carrier service configuration profiles based on combinations of the accessed set of identifier values, and computer program code for configuring the mobile wireless communication device using one of the selected carrier service configuration profiles.

In still another embodiment, a method is described. The method can be carried out by performing at least the following operations. Providing a mobile communication device having at least a first authentication code for authenticating a user of a mobile wireless communication device to a primary wireless communication service and a second authentication code for authenticating the user of the mobile wireless communication device to a secondary wireless communication service, wherein the primary and the secondary wireless communication services are different from each other and wherein the primary wireless communication service is the user's home wireless communication service, accessing a set of identifier values stored in the mobile wireless communication device associated with the secondary wireless when the user is in an area serviced only by the secondary wireless service, selecting a set of carrier service configuration profiles based on combinations of the accessed set of identifier values, configuring the mobile wireless communication device using one of the selected carrier service configuration profiles, and operating the mobile communication device in the area serviced only by the secondary wireless communication service without roaming.

BRIEF DESCRIPTION OF THE DRAWINGS

The invention and the advantages thereof may best be understood by reference to the following description taken in conjunction with the accompanying drawings.

FIGS. 5A and 5B illustrate formats of two additional identifiers optionally stored in mobile wireless communication devices.

DETAILED DESCRIPTION

Figure 1:
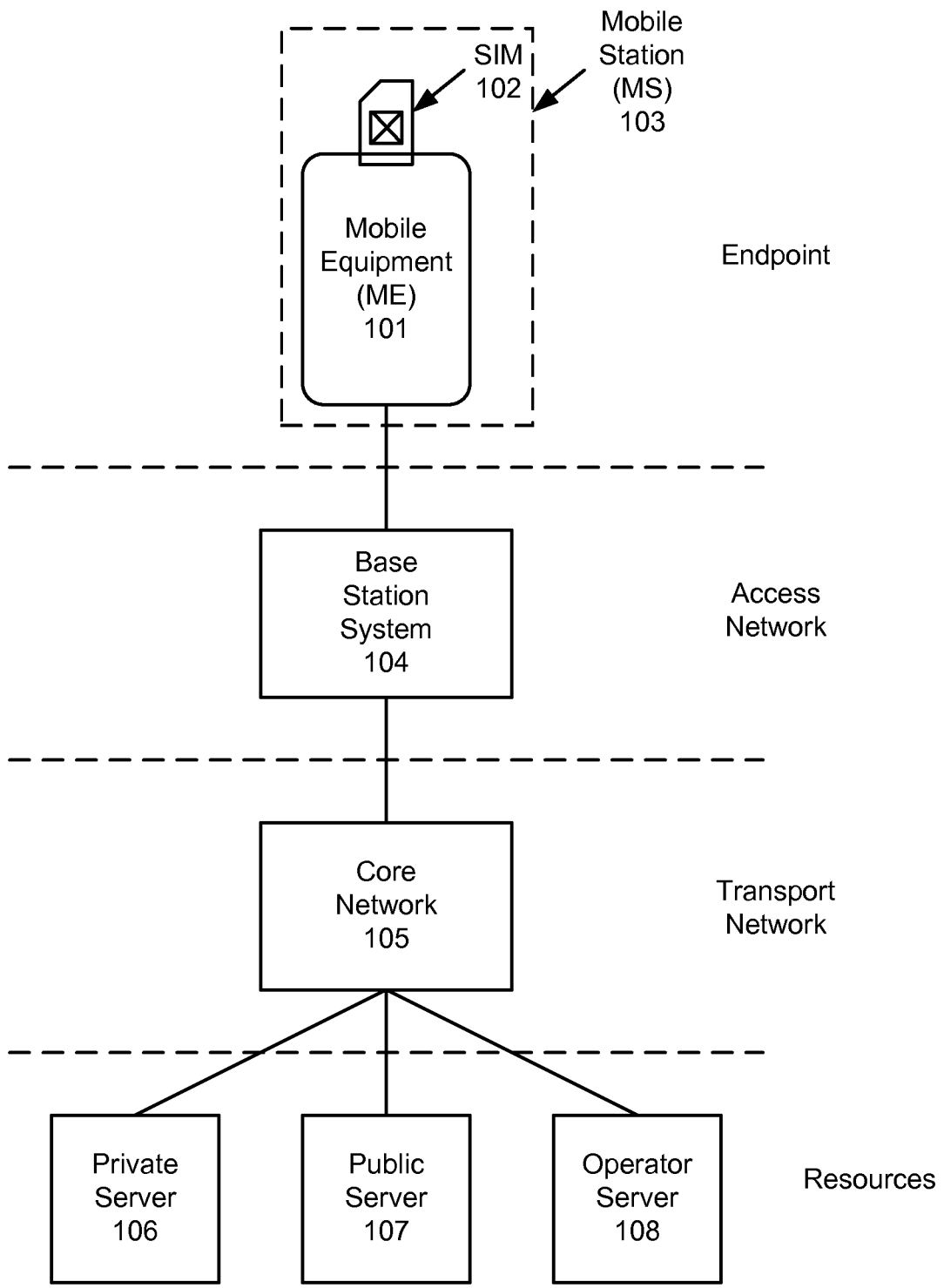
FIG. 1 illustrates a mobile wireless communication device communicating with resources through a communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Mobile wireless communication devices, such as a cellular telephone or a wireless personal digital assistant, can offer multiple communication services ranging from basic voice connections to text messaging to multi-media internet access. While a single manufactured mobile wireless communication device can include the capability to access a broad variety of services, a wireless service provider can restrict access to a set of services to which a user of the mobile wireless communication device subscribes. Additionally a wireless communication service provider can prefer to customize operational characteristics of the mobile wireless communication device when used on a particular wireless communications network. Customization can include, for example, to which short message service (SMS) or voice mail server the mobile wireless communication device points, or how the mobile wireless communication device connects to internet access. A manufacturer can supply the same mobile wireless communication device to multiple wireless communication service providers, each provider requiring a different customization. Customizing mobile wireless communication devices at the time of manufacture can prove logistically complex; thus it is preferable to customize each mobile wireless communication device closer to the point of sale to the user of the mobile wireless communication device.

Universal integrated circuit cards (UICC) are a form of "smart card" used in mobile wireless communication devices on various wireless communication networks. A well-known version of a UICC is a subscriber identity module (SIM) card that can be used in mobile wireless communication devices on Global System for Mobile Communications (GSM) wireless communication networks. Equivalents of SIM cards also include USIM cards on universal mobile telecommunication system (UMTS) networks and CSIM cards on Code Division Multiple Access (CDMA) networks. SIM cards can be issued by a wireless communication service provider to a user of a mobile wireless communication device. The SIM card can be inserted into the mobile wireless communication device and enable that device to identify a user of the mobile wireless communication device as a subscriber of set of services offered by a particular wireless communication service provider. In some configurations, a SIM card can enable a user to switch between using different wireless communication devices by simply removing the SIM card from a first device and inserting the SIM card into a second device. On some wireless communication networks, a mobile wireless communication device can be locked to a particular wireless communication service provider's SIM cards, such as when purchasing a mobile wireless communication device with a service subscription contract from a particular wireless communication service provider.

The SIM card contains a unique serial number known as an international mobile subscriber identity (ISMI) that can authenticate a user of a mobile wireless communication device to a wireless communication service provider through its wireless communication network. Portions of the IMSI can be accessed from the SIM card in a mobile wireless communication device to configure the device for a particular wireless communication service provider's network. Multiple wireless communication service providers, however, can share a common wireless communication network infrastructure, and current methods can only distinguish a particular network rather than an individual service provider offering services through that particular network.

Thus there exists a need to more flexibly configure a mobile wireless communication device using a combination of stored identifiers within the mobile wireless communication device, thereby enabling greater customization of mobile wireless communication devices for multiple wireless service providers using one or more different wireless communication networks.

FIG. 1 illustrates a representative mobile wireless communication device for a GSM network labeled as a mobile station (MS) 103 formed using a combination of a mobile equipment (ME) 101 and a SIM card 102. A plurality of mobile stations 103 can connect to a wireless communication service provider through an access network comprising one or more base station systems 104, each base station system 104 built from one or more wireless communication radio antennas and base station controllers (not shown). Wireless communication signals from multiple mobile stations 103 can be received and consolidated through the access network of base station systems 104 and routed to one or more resources located across a core "transport" network 105. Resources that support a wide variety of wireless communication services can include servers for voice mail and email managed by a wireless communication service provider, illustrated for example as an operator server 108. Other resources can include public data servers 107 available for access through the internet and private data servers 106 available for limited access through an enterprise network.

In today's deregulated telecommunications environment, equipment in each region can be owned and managed by different entities. Thus an endpoint mobile station 103 can be purchased by a user through a retail outlet, for example an Apple iPhone™ manufactured by Apple, Inc. of Cupertino, Calif. The mobile station 103 can include a SIM 102 configured to operate through base station systems 104 of a particular access network owned by a wireless network service provider, such as AT&T in the United States. Alternatively an identically manufactured end point mobile station 103 can be purchased by a user with a different SIM 102 configured to operate on a different wireless network service provider's infrastructure, such as Rogers Wireless in Canada. Each mobile station 103 can be identified and authenticated for use on a particular wireless infrastructure network based on identifiers stored in the SIM 102 installed in the mobile station 103. The limited set of identifiers used today, however, cannot distinguish between different wireless service providers that use the same wireless infrastructure network, nor can a particular wireless service provider differentiate between different groups of subscribers.

Wireless communication network providers can choose to offer different services to different types of wireless communication subscribers, such as those that subscribe to a monthly pay service versus a pre-paid service. Subscribers can have access to different resources through a wireless communication service provider's network based on their particular subscription. In some cases, users can be required to modify operational parameters of the mobile wireless communication device to access certain services by manually changing settings on the device, which can be inconvenient for the user and prone to error. Wireless communication network providers can also increase the use of their wireless network infrastructure through partnerships with mobile virtual network operators (MVNO) that do not own or operate a wireless network. An MVNO partner can share the same wireless infrastructure access network as the wireless communication network provider, and thus an MVNO cannot be distinguished from the wireless communication network provider partner when only a limited set of identifiers stored in the wireless mobile communication device are used. Expanding to customizing the operation of a wireless mobile communication device based on a wider set of identifiers can provide a mechanism to distinguish among different wireless service providers and among different groups of subscribers.

Figure 2:
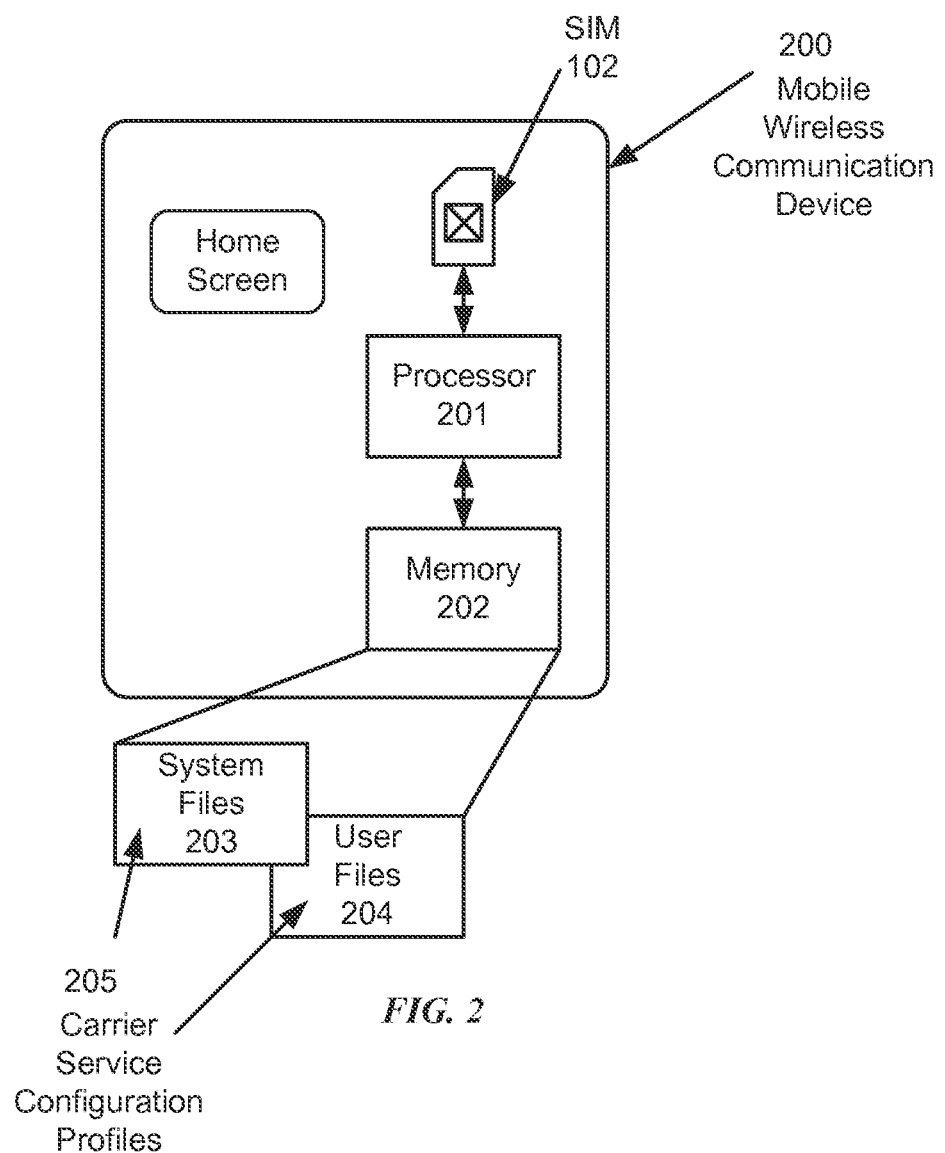
FIG. 2 illustrates components of a mobile wireless communication device.

FIG. 2 illustrates a representative mobile wireless communication device 200 that includes a processor 201 that can access information, such as a set of identifiers, stored in the SIM 102. The processor 201 can retrieve carrier service configuration profiles 205, also known as carrier bundles, stored in a directory of system files 203 and/or in a directory of user files 204 located in memory 202 of the mobile wireless communication device 200. Each carrier service configuration profile 205 can include settings customized for configuring the mobile wireless communication device 200 to operate on a particular wireless communication service provider's network. Carrier service configuration profiles 205 can be general, such as for any user of a wireless communication service provider's infrastructure network, or specific, such as for a select group of subscribers that can access a subset of services offered by an MVNO through a particular wireless communication service provider's infrastructure network. The mobile wireless communication device 200 can store many different carrier service configuration profiles 205 at the same time. When the mobile wireless communication device 200 recognizes a "new" SIM 102, such as when powering on the device or when inserting a SIM 102, a set of identifiers in the SIM 102 can be accessed to determine one or more carrier service configuration profiles 205 stored in the system files 203 or user files 204 that can be used to configure the mobile wireless communication device 200.

One mechanism to select which carrier service configuration profile 205 to configure a mobile wireless communication device 200 can be based on a portion of the IMSI, namely the mobile country code (MCC) and the mobile network code (MNC), stored in the SIM 102. Values for MCC and MNC are defined in international communication standards including ITU-T recommendation E.212. For example MCC value 310=US and MNC value 410=AT&T Mobility. An MCC/MNC combination can define a physical wireless infrastructure network. As more than one wireless network service provider, e.g. multiple MVNOs, can use the same physical wireless infrastructure network, a value for the MCC/MNC combination cannot identify a wireless network service provider with sufficient specificity. Additional identifiers to the MCC/MNC can be used to specify a particular wireless network service provider that offers service through a wireless infrastructure network. Similarly identifiers can be used to specify a group of subscribers having a particular service, or to whom a wireless network service provider wants to offer a particular "user experience." Rather than require a user to configure manually the mobile wireless communication device 200, it is preferred that configuration can occur automatically based on combinations of identifiers stored in the SIM 102.

Figure 3:
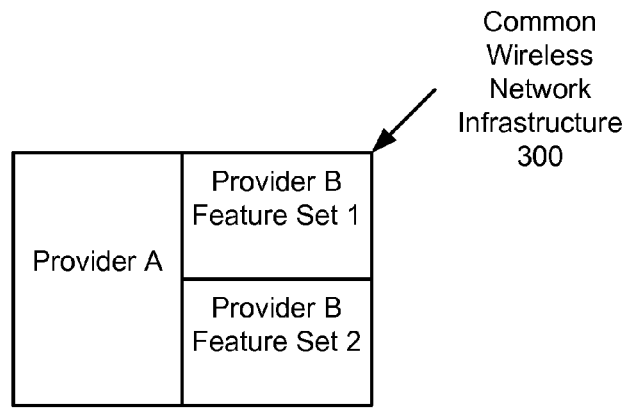
FIG. 3 illustrates a representative subdivision of a wireless network among multiple wireless communication service providers using a set of identifiers.

FIG. 3 illustrates conceptually that a common wireless network infrastructure 300 can be shared among two different wireless network service providers A and B, and a combination of identifiers can be used together to specify a particular set of operating characteristics of a mobile wireless communication device. FIG. 3 illustrates Provider A 301, Provider B Feature Set 1 302, and Provider B Feature Set 2 303. The pair of identifiers MCC and MNC described earlier can be common to both providers A and B, including different service options offered by providers A and B. A first additional identifier, (elementary file group identifier 1) labeled $EF_{GID1}$, can be used to specify provider A or B, while a second additional identifier, labeled $EF_{GID2}$, can be used to specify between two different feature sets offered by provider B. Representative operational service characteristic customizations can include changing what information displays on a "home screen" of the mobile wireless communication device 200 when connected to a particular wireless network service provider, such as AT&T or Rogers Wireless. A wireless network service provider can also require a particular application be loaded on the mobile wireless communication device 200 when using their service. FIG. 3 illustrates a simple representative embodiment, but additional identifiers and/or more complex combinations of identifiers can be used to specify a set of operational characteristics for a mobile wireless communication device.

Figure 4A:
FIGS. 4A and 4B illustrate formats of two identifiers stored in mobile wireless communication devices.

FIG. 4A illustrates a format of an international mobile subscriber identity (IMSI) 401 specified in the international telecommunications recommendation ITU-T E.212 for a SIM 102. The first three digits of the IMSI 401 can specify a mobile country code (MCC) 402. The next two or three digits of the IMSI 401 following the MCC 402 can specify a mobile network code (403). The final set of not more than 10 digits can specify a mobile subscriber identification number (MSIN) 404. A country or a region can be associated with one or more MCC 402 values. For example, US can be assigned MCC 402 values between 310 and 316, while Canada and Mexico can be assigned values 302 and 334 respectively. Mobile network codes 403 can be two digits, such as used in the European Union, or three digits as used in North America. Multiple MNC 403 values can be associated with a wireless mobile network service provider, such as for AT&T Mobility that operates multiple wireless infrastructure networks in different geographic regions of the US. A combination of MCC 402 and MNC 403 values can specify a particular wireless network service provider that owns and manages a physical wireless infrastructure network. The MCC/MNC combination, however, cannot specify an MVNO that uses the same wireless infrastructure network.

Figure 4B:
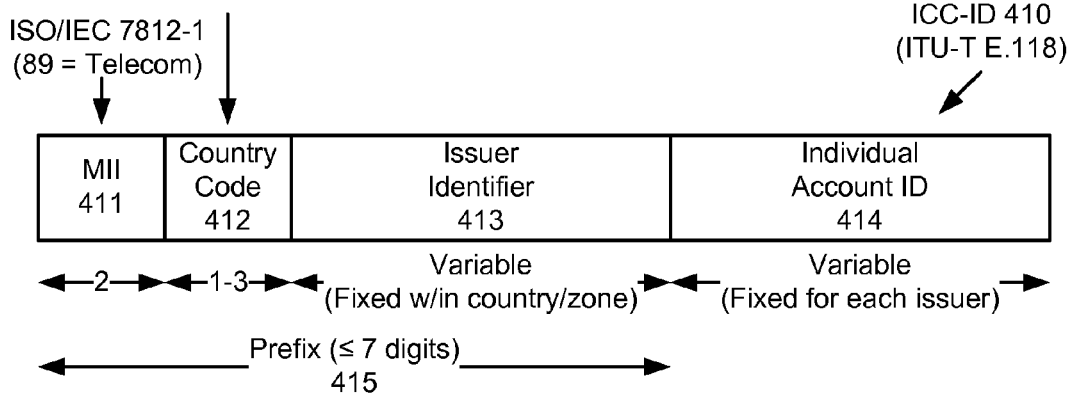

In addition to the IMSI 401, a SIM 102 can include a 19-20 digit integrated circuit card identifier (ICC-ID) 410 specified in ITU-T recommendation E.118 as illustrated in FIG. 4B. The ICC-ID 410 begins with a two digit major industry identifier (MII) 411, which is assigned the value 89 for telecommunications in the ISO/IEC 7812-1 standard. Following the MII 411 is a 1 to 3 digit country code 412 defined by ITU-T recommendation E.164. These country codes do not have the same values as the MCC 402 values used in the IMSI 401. After the country code 412, an issuer identifier 413 of a variable length can be used. Each country or regional zone can use a different length issuer identifier 413, although all issuer identifiers 413 within a country or regional zone can use the same number of digits. The MII 411, country code 412 and issuer identifier 413 together can form a maximum 7 digit prefix 415 for the ICC-ID 410. A variable length individual account ID 414 can follow the prefix 415. Each issuer can use the same length individual account ID 414. While the same identification information included in the MCC 402 and MNC 403 pair can be derived from the country code 412 and issuer identifier 413 in the ICC-ID prefix 415, there can be some difficulty parsing the ICC-ID prefix 415. Thus, the ICC-ID prefix 415 can be considered a separate piece of information from the MCC 402 and MNC 403. A particular MCC 402 and MNC 403 combination of values can specify a physical wireless infrastructure network, while an ICC-ID prefix 415 value can specify a wireless network service provider including an MVNO. Thus the ICC-ID prefix 415 can provide a more specific identification.

FIGS. 5A and 5B outline formats for two identifiers, optionally stored in SIM 102 cards, described in the 3GPP TS 31.102 wireless communication standard. The first identifier $EF_{GID1}$ 501 (elementary file group identifier 1) can vary in length from 1 to n bytes. Similarly the second identifier $EF_{GID2}$ 502 (elementary file group identifier 2) can range from 1 to n bytes. These two elementary file group identifiers can be used to specify a subset of SIM 102 cards having a particular property, such as a subset of SIM 102 cards associated with a particular wireless network service operator that cannot be specified by an MCC/MNC combination or a subset of SIM 102 cards having a specific set of operational parameters for a service. As the length of these group identifiers is arbitrarily long, a fine degree of specificity can be achieved when selecting a carrier service configuration profile with which to configure a wireless mobile communication device 200. This specificity can be realized by combining values for these elementary file group identifiers with values for the MCC 402, the MNC 403 and the ICC-ID prefix 415.

The system files 203 and user files 204 stored in memory 202 on the mobile wireless communication device 200 can include a set of carrier service configuration profiles 205. In an embodiment, the carrier service configuration profiles 205 can be files labeled with a series of identifiers. For example a file name for a particular carrier service configuration profile 205 can include a combination of values for one or more of MCC 402, MNC 403, $EF_{GID1}$ 501, $EF_{GID2}$ 502 and ICC-ID prefix 415. Carrier service configuration profiles 205 labeled with only values for MCC 402 and MNC 403 can provide a more generic configuration for the mobile wireless communication device 200, while carrier service configuration profiles 205 labeled with values for MCC 402, MNC 403, $EF_{GID1}$ 501 and $EF_{GID2}$ 502 can provide a more specific configuration. A hierarchy of specificity for carrier service configuration profiles 205 can be ranked from more generic to more specific as follows: MCC/MNC only (more generic), MCC/MNC+ICC-ID prefix, MCC/MNC $EF_{GID2}$, MCC/MNC+ $EF_{GID1}$, MCC/MNC $EF_{GID1}$+$EF_{GID2}$ (more specific).

A set of candidate carrier service configuration profiles 205 can be determined by searching for any carrier service configuration profile 205 with a matching pair of MCC 402 and MNC 403 values to those contained in the SIM 102 card of a mobile wireless communication device 200. Matching carrier service configuration profiles 205 can include, for example, those that match with MCC/MNC only, as well as those with greater specificity such as MCC/MNC/$EF_{GID1}$/$EF_{GID2}$. In order to configure the mobile wireless communication device 200, one configuration profile from the set of candidate carrier service configuration profiles 205 that match the MCC 402 and MNC 403 pair can be selected by assigning a numerical priority ranking score to each candidate carrier service configuration profile 205 based on specificity. As an example, a carrier configuration service profile 205 that matches on MCC/MNC only can be assigned a priority ranking score of 50 while a carrier service configuration profile 205 that matches on MCC/MNC/$EF_{GID1}$/$EF_{GID2}$ can be assigned a priority ranking score of 90. Other carrier service configuration profiles 205 with intermediate specificity can be assigned priority ranking scores in between. As one example, a carrier service configuration profile 205 that matches based on MCC/MNC/$EF_{GID1}$ or MCC/MNC/$EF_{GID2}$ can be assigned a priority ranking score of 80, while a carrier service configuration profile 205 that matches based on MCC/MNC/ICC-ID can be assigned a ranking of 70. Ideally, one carrier service configuration profile 205 has a highest priory score ranking and that carrier service configuration profile 205 can be used to configure the mobile wireless communication device 200; however, multiple carrier service configuration profiles 205 can have the same priority ranking, in which case a version number for the carrier service configuration profiles 205 can be read to determine the most recently updated one to use.

The directories of system files 203 and user files 204 located in memory 202 of the mobile wireless communication device 200 can be updated in the field, for example by synchronizing the mobile wireless communication device 200 through an update from the wireless service network provider to which the user (as identified by the IMSI in the SIM 102) subscribes for wireless service. This update can be accomplished automatically in the background, without user intervention, by sending a series of short message system (SMS) messages. Alternatively, an update can occur when synchronizing the mobile wireless communication device 200 with a computing device (such as a personal computer on which backup files are stored). A user can also actively request updates.

Typically carrier service configuration profiles 205 in the system files 203 directory can be updated when updating a systems software version for the mobile wireless communication device 200. Carrier service configuration profiles 205 in the user files 204 directory can be updated through a computing device synchronization or background process with the service provider. As such, both the system files 203 directory and the user files 204 directory can be searched when looking for matching candidate carrier service configuration profiles 205. In some embodiments, it is preferred that a system reboot of the mobile wireless communication device 200 not be required to change the carrier service configuration profile in use. Certain wireless service functions, for example enabling an advanced service such as video multimedia messaging services (MMS), can require using a new carrier service configuration profile 205. In some embodiments, a user can select a particular service feature and receive an updated carrier service configuration profile 205 with which to configure the mobile wireless communication device 200 to use the particular service feature.

Figure 6:
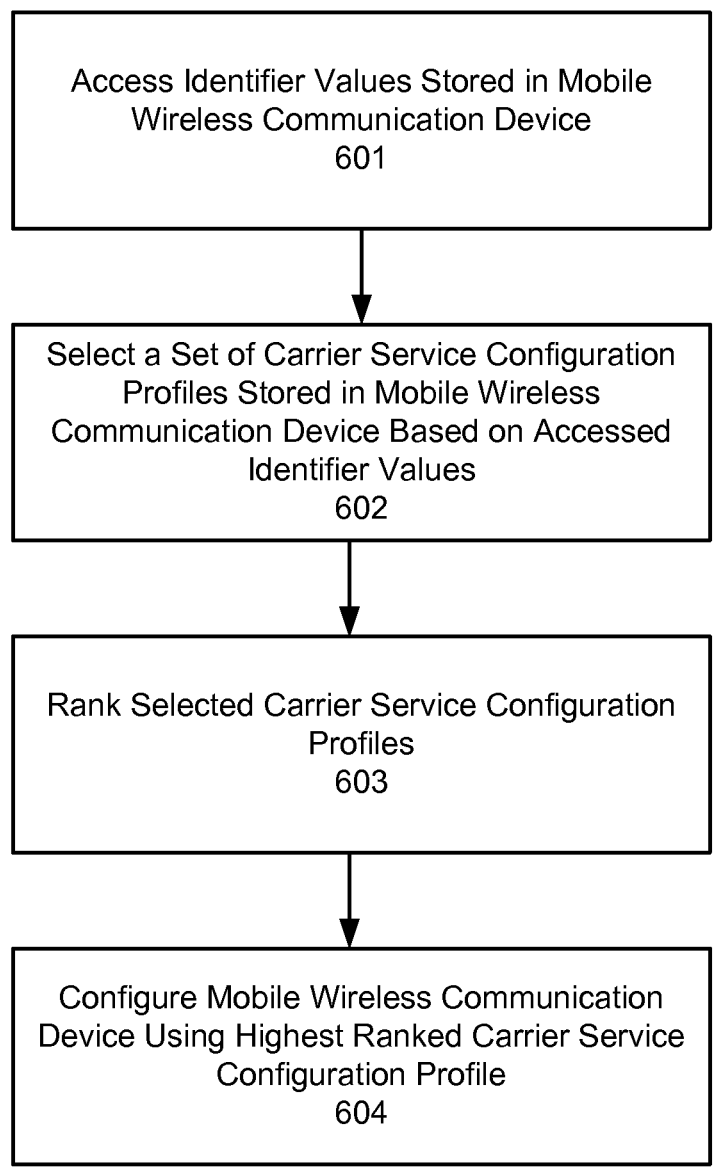
FIG. 6 illustrates a representative method for configuring a mobile wireless communication device using a set of identifier values stored in the mobile wireless communication device.

FIG. 6 illustrates a method of configuring a mobile wireless communication device 200 using a set of identifiers. In step 601 a set of identifier values stored in the mobile wireless communication device 200 can be accessed. In step 602 a set of carrier service configuration profiles 205 stored in the mobile wireless communication device 200 can be selected based on combinations of the accessed identifier values. In step 603 each of the selected carrier service configuration profiles 205 can be priority ranked based on a range of specificity for matching the carrier service configuration profile 205 to the combination of accessed identifier values. In step 604, the mobile wireless communication device 200 can be configured using the highest ranked wireless service configuration profile 604. In some embodiments, when more than one wireless service configuration profile 604 have the same highest ranking, a most recent wireless service configuration profile 604 having the highest ranking can be used for configuring the mobile wireless communication device 200.

In addition to differentiating between a wireless service provider that owns and operates its own wireless infrastructure network from an MVNO, the described wireless carrier service configuration method can provide customization for large enterprise customers of a wireless service provider. An enterprise customer can have a contract with a wireless communication service provider to offer specific services to their employees on a set of mobile wireless communication devices. As one example, the carrier service configuration profile 205 specific to the enterprise customer on the particular carrier's network can direct the mobile wireless communication device 200 to use a specific set of secure servers for electronic mail synchronization. This can be accomplished by including specific values for the identifiers $EF_{GID1}$ 501 and $EF_{GID2}$ 502 stored in the SIM 102 card on the mobile wireless communication devices 200 supplied to the enterprise customer.

In some embodiments, a mobile wireless communication device 200 can include multiple IMSI 401 values on the same SIM 102 card. A user of the mobile wireless communication device 200 can, for example, subscribe to a service whereby one wireless infrastructure network can be used as a "home" network (identified by one IMSI 401) and a different wireless infrastructure network can be used as a "visiting" network (identified by a second IMSI 401), without incurring roaming charges. This dual IMSI 401 arrangement can occur through partnering agreements between the two wireless communication service providers that own and manage the two different wireless communication networks. Certain service features, however, for the user of the mobile wireless communication device 200 can require different operating characteristics for each network on which the mobile wireless communication device 200 is used. As one example, an MMS service can require the mobile wireless communication device 200 to point to a set of MMS servers located on the "home" network rather than a set of MMS servers used by the "visiting" network. The identifiers $EF_{GID1}$ 501 and $EF_{GID2}$ 502 stored in the SIM 102 card can be used to select a carrier service configuration profile 205 that correctly configures the mobile wireless communication device 200. Thus, in some embodiments, certain services can depend on the MCC 402 and MNC 403 values, while other services can depend on the $EF_{GID1}$ 501 and $EF_{GID2}$ 502 values. As an example, assume Rogers Wireless corresponds to an MCC/MNC value of 302/720 and Movistar corresponds to an MCC/MNC value of 334/03. If Rogers Wireless has an agreement with Movistar, whereby subscribers to Rogers Wireless service can access certain services on the Rogers Wireless network, even when the user is operating the mobile wireless communication device 200 on the Movistar network, then the $EF_{GID1}$ 501 and $EF_{GID2}$ 502 values stored in the SIM 102 card can be associated with distinguishing such a service. For example, an $EF_{GID1}/EF_{GID2}$ value of 1111/2222 can correspond to access to Rogers Wireless MMS servers when combined with MCC/MNC values of 302/720 (on Rogers Wireless network) or 334/03 (on Movistar network).

Various aspects of the described embodiments can be implemented by software, hardware or a combination of hardware and software. The described embodiments can also be embodied as computer program code on a computer readable medium for configuring a mobile wireless communication device. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for configuring a wireless communication device, the method comprising:
at the wireless communication device:
identifying, in a storage module of the wireless communication device, a set of carrier service configuration profiles based on a combination of values for (i) a set of generic identifiers and (ii) at least one additional identifier;
selecting a carrier service configuration profile that specifies a particular set of operating characteristics for the wireless communication device from the set of carrier service configuration profiles; and
configuring the wireless communication device using the selected carrier service configuration profile,
wherein the set of generic identifiers comprises a Mobile Country Code (MCC) identifier and a Mobile Network Code (MNC) identifier, and
wherein the at least one additional identifier comprises one or more elementary file group identifiers, and
wherein the one or more elementary file group identifiers comprise a first elementary file group identifier that specifies a wireless carrier, and a second elementary file group identifier that specifies a particular feature set offered by the specified wireless carrier.

2. The method of claim 1, wherein the configuring of the wireless communication device using the selected carrier service configuration profile occurs automatically without network control during the configuring.

3. The method of claim 1, wherein the selected carrier service configuration profile comprises one or more operational service characteristic customizations.

4. The method of claim 3, wherein the one or more operational service characteristic customizations include at least one of a home screen to be displayed at the wireless communication device and an application to be loaded at the wireless communication device.

5. The method of claim 1, wherein:
the storage module of the wireless communication device comprises a Subscriber Identity Module (SIM) card; and
the at least one additional identifier further comprises an integrated circuit card identifier that is stored in the SIM card as identifying information within an Integrated Circuit Card Identifier (ICC-ID) prefix.

6. The method of claim 1, wherein:
the wireless communication device is configured to store a plurality of carrier service configuration profiles; and
the set of generic identifiers in combination with the at least one additional identifier corresponds to only one carrier service configuration profile of the plurality of carrier service configuration profiles stored in the storage module of the wireless communication device.

7. The method of claim 1, the method further comprising determining a priority ranking of carrier service configuration profiles that is based in part on the combination of values for (i) the set of generic identifiers and (ii) the at least one additional identifier.

8. The method of claim 1, wherein the combination of values for (i) the set of generic identifiers and (ii) the at least one additional identifier comprises a combination of values for MCC and MNC, combined with a) either a value of the first elementary file group identifier and/or a value for the second elementary file group identifier, or b) a value for an integrated circuit card identifier.

9. A wireless communication device, comprising:
one or more processors;
a storage device storing executable instructions that, when executed by the one or more processors, causes the wireless communication device to:
identify, in a storage module of the wireless communication device, a set of carrier service configuration profiles based on a combination of values for (i) a set of generic identifiers and (ii) at least one additional identifier;
select a carrier service configuration profile that specifies a particular set of operating characteristics for the wireless communication device from the set of carrier service configuration profiles; and
configure the wireless communication device for a specific wireless carrier using the selected carrier service configuration profile,
wherein the set of generic identifiers comprises a Mobile Country Code (MCC) identifier and a Mobile Network Code (MNC) identifier, and
wherein the at least one additional identifier comprises one or more elementary file group identifiers, and
wherein the one or more elementary file group identifiers comprise a first elementary file group identifier that specifies a wireless carrier, and a second elementary file group identifier that specifies a particular feature set offered by the specified wireless carrier.

10. The wireless communication device of claim 9, wherein the at least one additional identifier further comprises an integrated circuit card identifier that is stored in an identity module as identifying information within an Integrated Circuit Card Identifier (ICCID) prefix.

11. The wireless communication device of claim 9, wherein:
the storage device is configured to store a plurality of carrier service configuration profiles; and
at least one generic identifier of the set of generic identifiers corresponds to multiple carrier service configuration profiles of the plurality of carrier service configuration profiles stored in the storage device.

12. The wireless communication device of claim 11, wherein the at least one generic identifier in combination with the at least one additional identifier corresponds to only one carrier service configuration profile of the plurality of carrier service configuration profiles stored in the storage device.

13. The wireless communication device of claim 9, wherein the wireless communication device is automatically configured without network control during the configuring.

14. The wireless communication device of claim 9, wherein the selected carrier service configuration profile comprises one or more operational service characteristic customizations that include at least one of a home screen to be displayed at the wireless communication device and an application to be loaded at the wireless communication device.

15. A non-transitory computer readable medium storing executable instructions that, when executed by one or more processors of a wireless communication device, causes the wireless communication device to:
  identify a set of generic identifiers in a Subscriber Identity Module (SIM) of the wireless communication device;
  determine when at least one additional identifier exists in the SIM of the wireless communication device and provides for carrier-specific identification;
  combine the set of generic identifiers and the at least one additional identifier to create a set of complex identifiers that specify operational service characteristics for the wireless communication device;
  select a complex identifier that determines a carrier service configuration profile; and
  configure the wireless communication device for a specific wireless carrier using the carrier service configuration profile,
  wherein the set of generic identifiers comprises a Mobile Country Code (MCC) identifier and a Mobile Network Code (MNC) identifier, and
  wherein the at least one additional identifier comprises one or more elementary file group identifiers or an integrated circuit card identifier, and
  wherein the one or more elementary file group identifiers comprise a first elementary file group identifier that specifies a wireless carrier, and a second elementary file group identifier that specifies a particular feature set offered by the specified wireless carrier and the integrated circuit card identifier comprises an Integrated Circuit Card Identifier (ICC-ID) prefix of the SIM.

16. The non-transitory computer readable medium of claim 15, wherein the set of generic identifiers corresponds to multiple carrier service configuration profiles stored in the SIM of the wireless communication device.

17. The non-transitory computer readable medium of claim 16, wherein the set of generic identifiers in combination with the at least one additional identifier corresponds to only one carrier service configuration profile of the multiple carrier service configuration profiles.

* * * * *